US012654799B2

(12) United States Patent
Kizu

(10) Patent No.: US 12,654,799 B2
(45) Date of Patent: Jun. 16, 2026

(54) SUPPORT STRUCTURE FOR COMMUNICATION DEVICE

(71) Applicant: SUZUKI MOTOR CORPORATION, Hamamatsu (JP)

(72) Inventor: Hikaru Kizu, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 100 days.

(21) Appl. No.: 18/452,990

(22) Filed: Aug. 21, 2023

(65) Prior Publication Data

US 2024/0140552 A1 May 2, 2024

(30) Foreign Application Priority Data

Oct. 31, 2022 (JP) ................................. 2022-174052

(51) Int. Cl.
*B62J 50/21* (2020.01)
*B62J 50/22* (2020.01)
*B62J 6/022* (2020.01)

(52) U.S. Cl.
CPC ............. *B62J 50/225* (2020.02); *B62J 50/22* (2020.02); *B62J 6/022* (2020.02)

(58) Field of Classification Search
CPC ........... B62J 50/225; B62J 50/22; B62J 6/022
USPC ...................................................... 340/425.5
See application file for complete search history.

(56) References Cited

U.S. PATENT DOCUMENTS

| | | | | | |
|---|---|---|---|---|---|
| 4,981,243 | A * | 1/1991 | Rogowski | ................ | B62J 11/00 |
| | | | | | 224/454 |
| 6,483,467 | B2 * | 11/2002 | Kushida | ................... | H01Q 1/40 |
| | | | | | 343/711 |
| 6,876,845 | B1 * | 4/2005 | Tabata | ................. | H04B 1/3822 |
| | | | | | 455/344 |
| 9,254,039 | B1 * | 2/2016 | Huey | ..................... | F16M 11/22 |
| 11,753,103 | B2 * | 9/2023 | Saeki | ....................... | B62J 11/00 |
| | | | | | 280/288.4 |
| 2002/0003501 | A1 * | 1/2002 | Kushida | ................... | B62J 17/02 |
| | | | | | 343/721 |
| 2004/0211610 | A1 * | 10/2004 | Ito | ........................... | B62J 17/10 |
| | | | | | 180/228 |
| 2005/0174795 | A1 * | 8/2005 | Tazaki | ................... | B60Q 1/045 |
| | | | | | 362/546 |
| 2006/0087144 | A1 * | 4/2006 | Kamimura | ............... | B62J 17/10 |
| | | | | | 296/78.1 |

(Continued)

FOREIGN PATENT DOCUMENTS

| | | |
|---|---|---|
| EP | 3 838 728 A1 | 12/2020 |
| EP | 3 981 678 A2 | 10/2021 |

(Continued)

OTHER PUBLICATIONS

Extended European Search Report dated Jan. 25, 2024, issued by the European Patent Office in corresponding application EP 23193058.7.

*Primary Examiner* — Brian A Zimmerman
*Assistant Examiner* — Thang D Tran
(74) *Attorney, Agent, or Firm* — Stein IP, LLC

(57) ABSTRACT

A support structure for a communication device mounted on a straddle-type vehicle. The support structure includes a headlamp unit configured to illuminate front of the vehicle, and a communication device support portion configured to support the communication device. The communication device support portion is located below the headlamp unit.

16 Claims, 5 Drawing Sheets

(56)　　　　References Cited

U.S. PATENT DOCUMENTS

| | | | | |
|---|---|---|---|---|
| 2006/0139939 | A1* | 6/2006 | Ohira | B62K 19/30 |
| | | | | 362/476 |
| 2006/0244575 | A1* | 11/2006 | Ramirez | B60R 25/104 |
| | | | | 340/426.35 |
| 2008/0030041 | A1* | 2/2008 | Kurihara | B62J 17/06 |
| | | | | 296/78.1 |
| 2010/0082249 | A1* | 4/2010 | Ando | G01C 21/3632 |
| | | | | 701/431 |
| 2010/0097325 | A1* | 4/2010 | Nagao | B62K 21/26 |
| | | | | 345/173 |
| 2011/0267178 | A1* | 11/2011 | Nishihara | B62M 25/08 |
| | | | | 340/12.32 |
| 2011/0304176 | A1* | 12/2011 | Kihara | B60K 11/04 |
| | | | | 29/890.03 |
| 2012/0159705 | A1* | 6/2012 | Tsukada | A61G 7/015 |
| | | | | 5/2.1 |
| 2014/0197656 | A1* | 7/2014 | Ochiai | H05K 5/069 |
| | | | | 296/37.1 |
| 2014/0265843 | A1* | 9/2014 | Troxler | B62J 6/01 |
| | | | | 315/77 |
| 2014/0268839 | A1* | 9/2014 | Timmerberg | B60Q 1/00 |
| | | | | 362/103 |
| 2015/0159793 | A1* | 6/2015 | Nagaya | F16L 37/0885 |
| | | | | 285/93 |
| 2017/0001674 | A1* | 1/2017 | Ishii | B62J 6/022 |
| 2017/0050695 | A1* | 2/2017 | Shikanai | B62J 23/00 |
| 2017/0166277 | A1* | 6/2017 | Konno | B62J 17/10 |
| 2017/0201816 | A1* | 7/2017 | Patrone | H04R 1/028 |
| 2018/0001950 | A1* | 1/2018 | Allen | B62J 9/21 |
| 2018/0334216 | A1* | 11/2018 | Montez | B62J 50/225 |

| | | | | |
|---|---|---|---|---|
| 2019/0047632 | A1* | 2/2019 | Kim | B60G 13/003 |
| 2019/0144071 | A1* | 5/2019 | Boehm | B62M 9/1242 |
| | | | | 474/80 |
| 2019/0229413 | A1* | 7/2019 | Jong | H01Q 1/523 |
| 2019/0276116 | A1* | 9/2019 | Mishima | B62M 6/45 |
| 2020/0029194 | A1* | 1/2020 | Speaker | H04W 4/027 |
| 2020/0094657 | A1* | 3/2020 | Yoshiura | B60J 1/04 |
| 2020/0130777 | A1* | 4/2020 | Yamazaki | B62M 25/08 |
| 2020/0346706 | A1* | 11/2020 | Isenschmid | G08G 1/166 |
| 2021/0039737 | A1* | 2/2021 | Montez | H04N 23/90 |
| 2021/0053638 | A1* | 2/2021 | Muramatsu | B62J 6/027 |
| 2021/0061389 | A1* | 3/2021 | Kawamura | B62J 6/027 |
| 2021/0078484 | A1* | 3/2021 | Fujii | B60Q 1/122 |
| 2021/0175614 | A1* | 6/2021 | Hashimoto | H01Q 1/3233 |
| 2021/0188384 | A1* | 6/2021 | Saeki | B62J 11/00 |
| 2021/0203063 | A1* | 7/2021 | Kuroba | B62J 45/41 |
| 2022/0013923 | A1* | 1/2022 | Morita | H04B 17/101 |
| 2022/0048576 | A1* | 2/2022 | Kim | H01M 50/249 |
| 2022/0073164 | A1* | 3/2022 | Nakayama | B62J 11/00 |
| 2022/0126943 | A1* | 4/2022 | Yamamoto | B62J 17/10 |
| 2022/0266910 | A1* | 8/2022 | Kim | B62D 21/152 |
| 2022/0297782 | A1* | 9/2022 | Sawada | B62J 17/10 |
| 2022/0317240 | A1* | 10/2022 | Rydström | G01S 13/931 |

FOREIGN PATENT DOCUMENTS

| | | | | |
|---|---|---|---|---|
| JP | | 2012-176755 | A | 9/2012 |
| JP | | 2012176755 | * | 9/2012 |
| JP | | 2012-232657 | A | 11/2012 |
| JP | | 2018-095139 | A | 6/2018 |
| JP | | 2021-142875 | A | 9/2021 |
| WO | WO 2020/110483 | A1 | | 6/2020 |

* cited by examiner

SUPPORT STRUCTURE FOR COMMUNICATION DEVICE

CROSS-REFERENCE TO RELATED APPLICATIONS

This application is based on and claims priority under 35 USC 119 from Japanese Patent Application No. 2022-174052 filed on Oct. 31, 2022, the entire content of which is incorporated herein by reference.

TECHNICAL FIELD

The present invention relates to a support structure for a communication device.

BACKGROUND ART

In the related art, a straddle-type vehicle is known in which a communication device is supported above a headlamp (for example, see JP2018-095139A). In the straddle-type vehicle disclosed in JP2018-095139A, a meter unit is attached to a front side of an upper bracket of a front fork, and the meter unit is positioned above the headlamp. The communication device is supported on a back surface of a speedometer of the meter unit via a stay, and the communication device is accommodated inside an instrument cover of the meter unit. Since the communication device is supported above the headlamp, communication of the communication device is not inhibited by the headlamp.

However, in the straddle-type vehicle disclosed in JP2018-095139A, since the communication device is accommodated in the instrument cover, the instrument cover needs to be inflated more than necessary, and the appearance may deteriorate.

SUMMARY OF INVENTION

Aspect of non-limiting embodiments of the present disclosure relates to provide a support structure for a communication device capable of improving the appearance of a straddle-type vehicle.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a support structure for a communication device mounted on a straddle-type vehicle, the support structure including:

a headlamp unit configured to illuminate front of the vehicle; and a communication device support portion configured to support the communication device, in which the communication device support portion is located below the headlamp unit.

BRIEF DESCRIPTION OF DRAWINGS

Exemplary embodiment(s) of the present invention will be described in detail based on the following figures, wherein:

FIG. 1 is a perspective view of a vehicle front portion of a straddle-type vehicle according to an exemplary embodiment of the present invention as viewed from above;

FIG. 3 is a cross-sectional view of the straddle-type vehicle in FIG. 2 taken along a line III-III;

Figure 5:
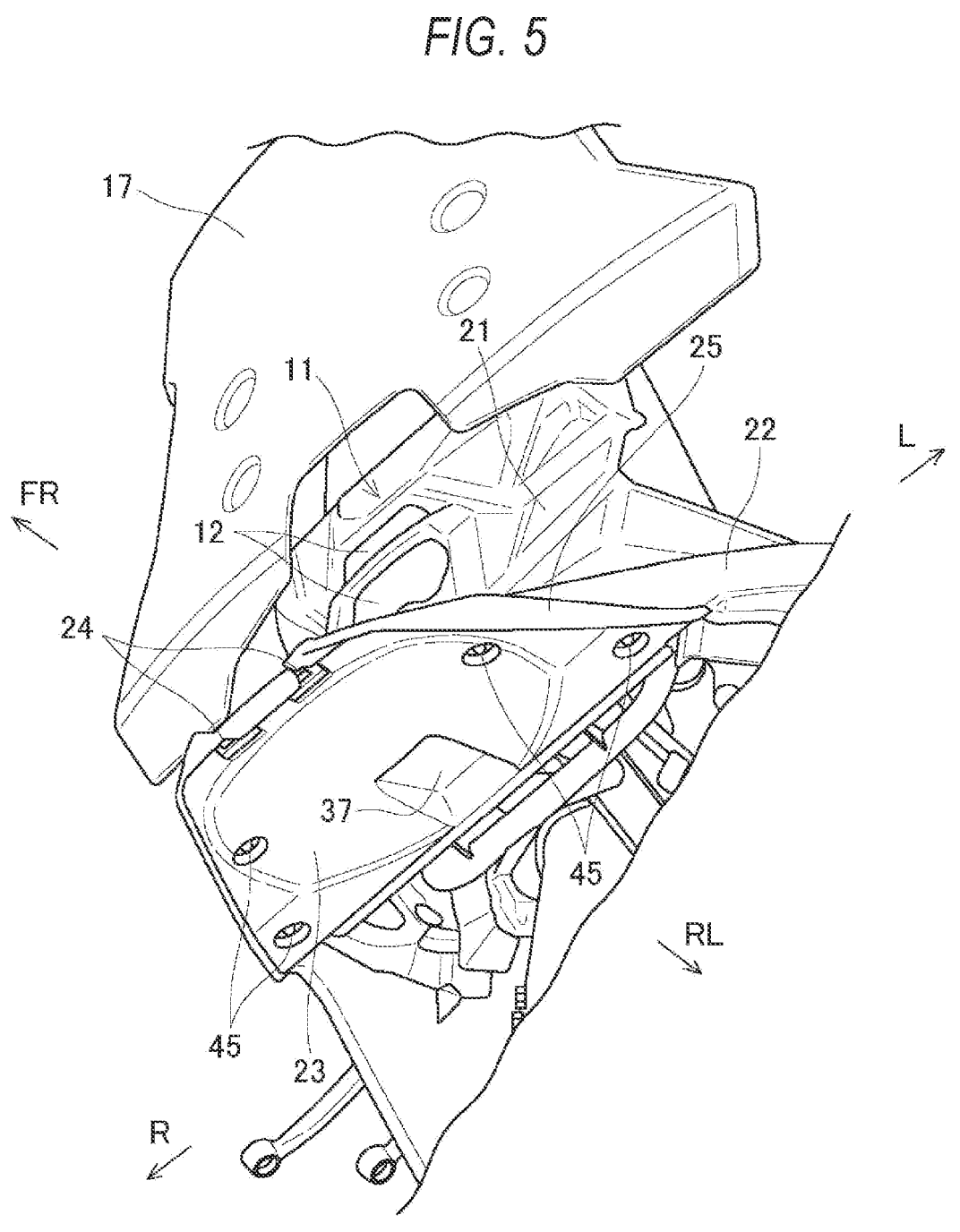

FIG. 5 is a perspective view of the vehicle front portion of the straddle-type vehicle according to an exemplary embodiment of the present invention as viewed from below.

DESCRIPTION OF EMBODIMENTS

A communication device is mounted to a straddle-type vehicle according to an aspect of the present invention. A support structure for the communication device includes a headlamp unit configured to illuminate the front of the vehicle, and a communication device support portion configured to support the communication device. Since the communication device support portion is located below the headlamp unit and the communication device is supported by the communication device support portion, the communication device is inconspicuous, and the appearance of the straddle-type vehicle is improved. A space below the headlamp unit is less likely to be affected by rain and wind, and the durability of the communication device is improved.

EMBODIMENT

Figure 1:
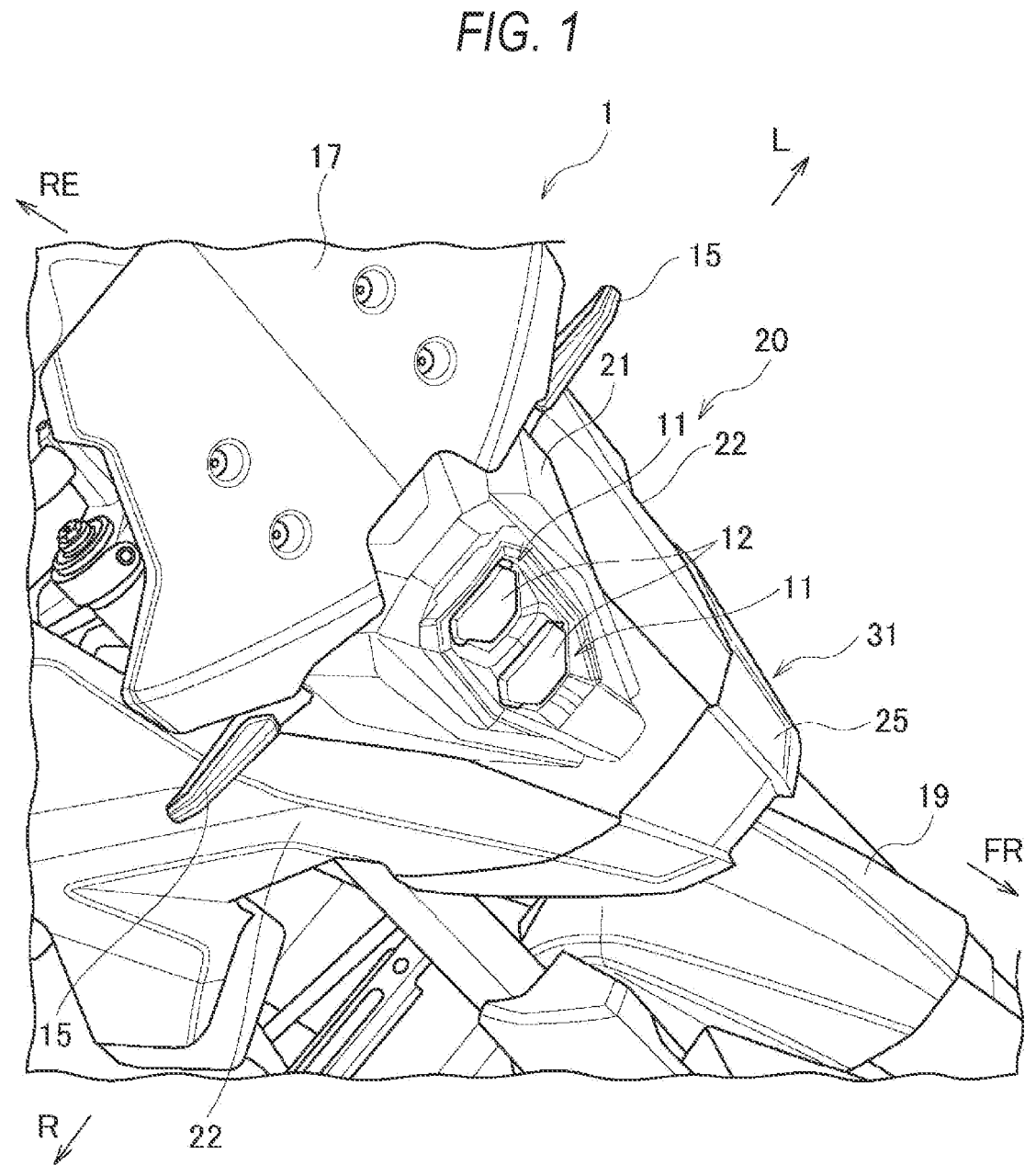
Figure 2:
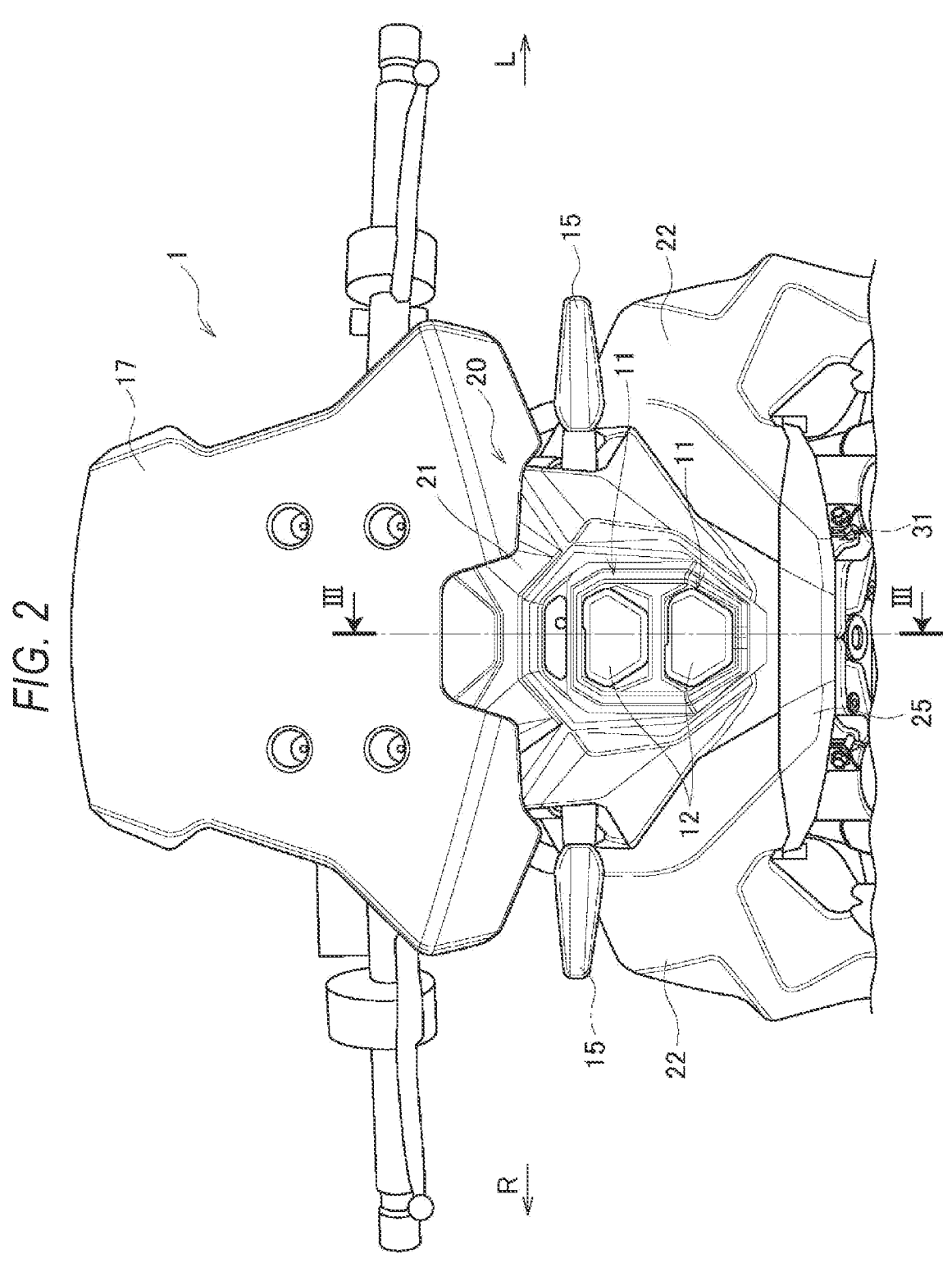
FIG. 2 is a front view of the vehicle front portion of the straddle-type vehicle according to an exemplary embodiment of the present invention.

Hereinafter, a straddle-type vehicle according to the present embodiment will be described with reference to the accompanying drawings. FIG. 1 is a perspective view of a vehicle front portion of the straddle-type vehicle according to the present embodiment as viewed from above. FIG. 2 is a front view of the vehicle front portion of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIGS. 1 and 2, two upper and lower headlamp units 11 configured to illuminate the front of the vehicle are provided in a center of a front portion of the straddle-type vehicle 1. A periphery of the two headlamp units 11 is covered with a front center cover (an upper cover) 21. Two upper and lower openings are formed in the front center cover 21. Lenses 12 of the headlamp unit 11 are exposed to the outside from the openings. A pair of turn signal lamps 15 protrude from the front center cover 21 to the left and right sides. A screen 17 for windbreak is attached to an upper portion of the front center cover 21.

A pair of front side covers 22 are provided on sides of the front portion of the straddle-type vehicle 1. Front portions of the pair of front side covers 22 cover sides of the front center cover 21. A lower portion of the front center cover 21 protrudes forward from below the headlamp unit 11. The front portion of the front side covers 22 protrude forward along the front center cover 21. The front center cover 21 and the front side covers 22 protrude forward in a beak shape having a small width and a small height. An outer surface of a distal end of a beak-shaped protruding portion 31 is covered with a distal end cover 25.

A front lower cover (a lower cover) 23 is provided below the front center cover 21 (see FIG. 3). A bottom wall 33 of the beak-shaped protruding portion 31 is formed by the front lower cover 23. In this way, a front cover 20 of the straddle-type vehicle 1 is formed by the front center cover 21, the pair of front side covers 22, the front lower cover 23, and the distal end cover 25. The protruding portion 31 of the front cover 20 is located above a front fender 19. The front fender 19 and the protruding portion 31 is configured to protect the headlamp unit 11 from flying stones thrown up from a road surface, and the like.

The straddle-type vehicle 1 may be provided with a communication device 41 (see FIG. 3) such as an in-vehicle antenna of an electronic toll collection (ETC). In a case where the communication device 41 is provided in an upper portion of the headlamp unit 11 in a manner of not interfering with the communication, it is necessary to lengthen a communication cable or to add an attachment bracket for the communication device 41. The upper portion of the headlamp unit 11 may be conspicuous, and the installation of the communication device 41 may deteriorate the appearance of the straddle-type vehicle 1. Therefore, in the present embodiment, the communication device 41 is provided by effectively using an inner space of the beak-shaped protruding portion 31 of the front cover 20.

Figure 4:
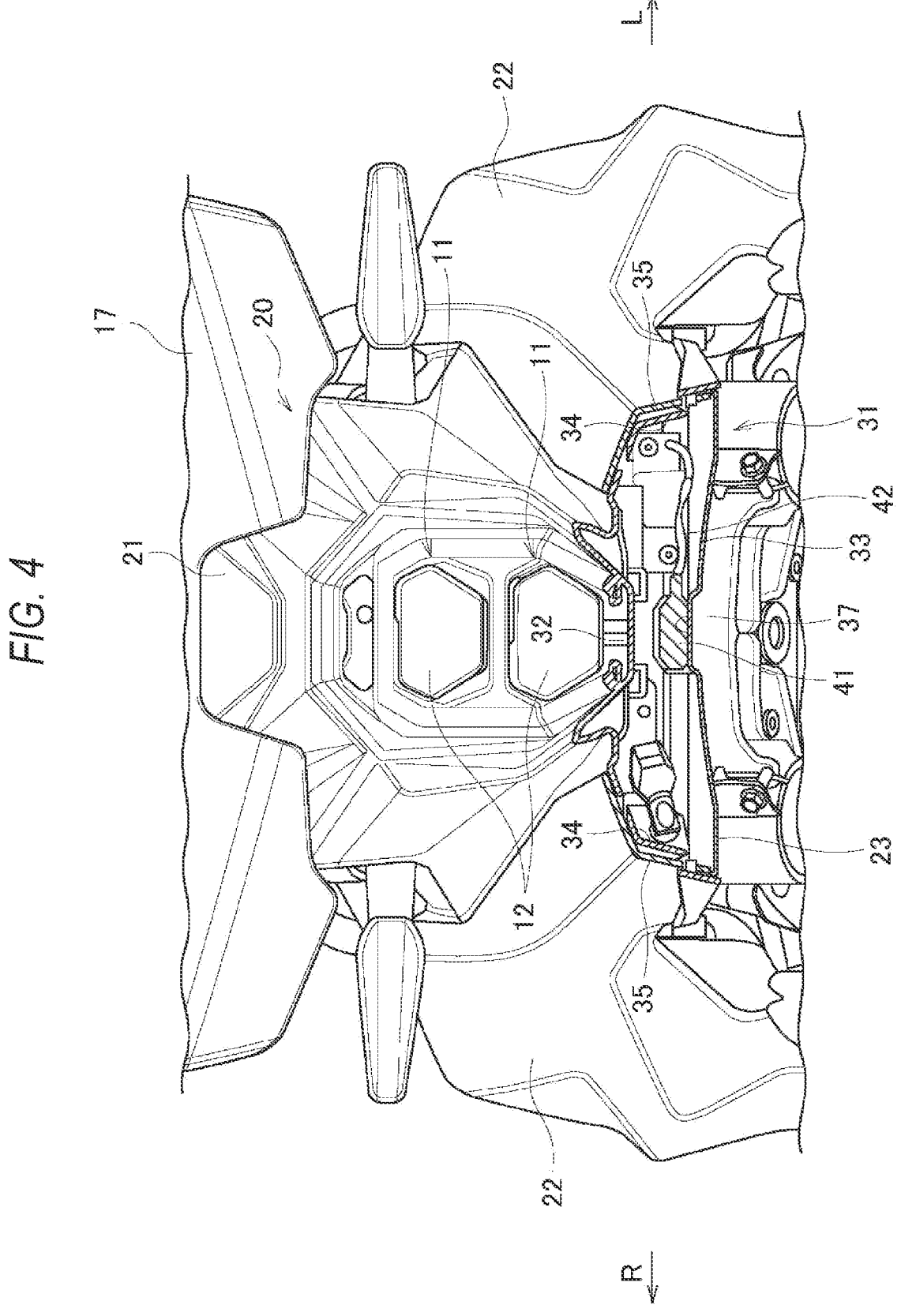
FIG. 4 is a cross-sectional view of the straddle-type vehicle in FIG. 3 taken along a line IV-IV.

A support structure for a communication device will be described with reference to FIGS. 3 to 5. FIG. 3 is a cross-sectional view of the straddle-type vehicle in FIG. 2 taken along a line FIG. 4 is a cross-sectional view of the straddle-type vehicle in FIG. 3 taken along a line IV-IV. FIG. 5 is a perspective view of the vehicle front portion of the straddle-type vehicle according to the present embodiment as viewed from below.

Figure 3:
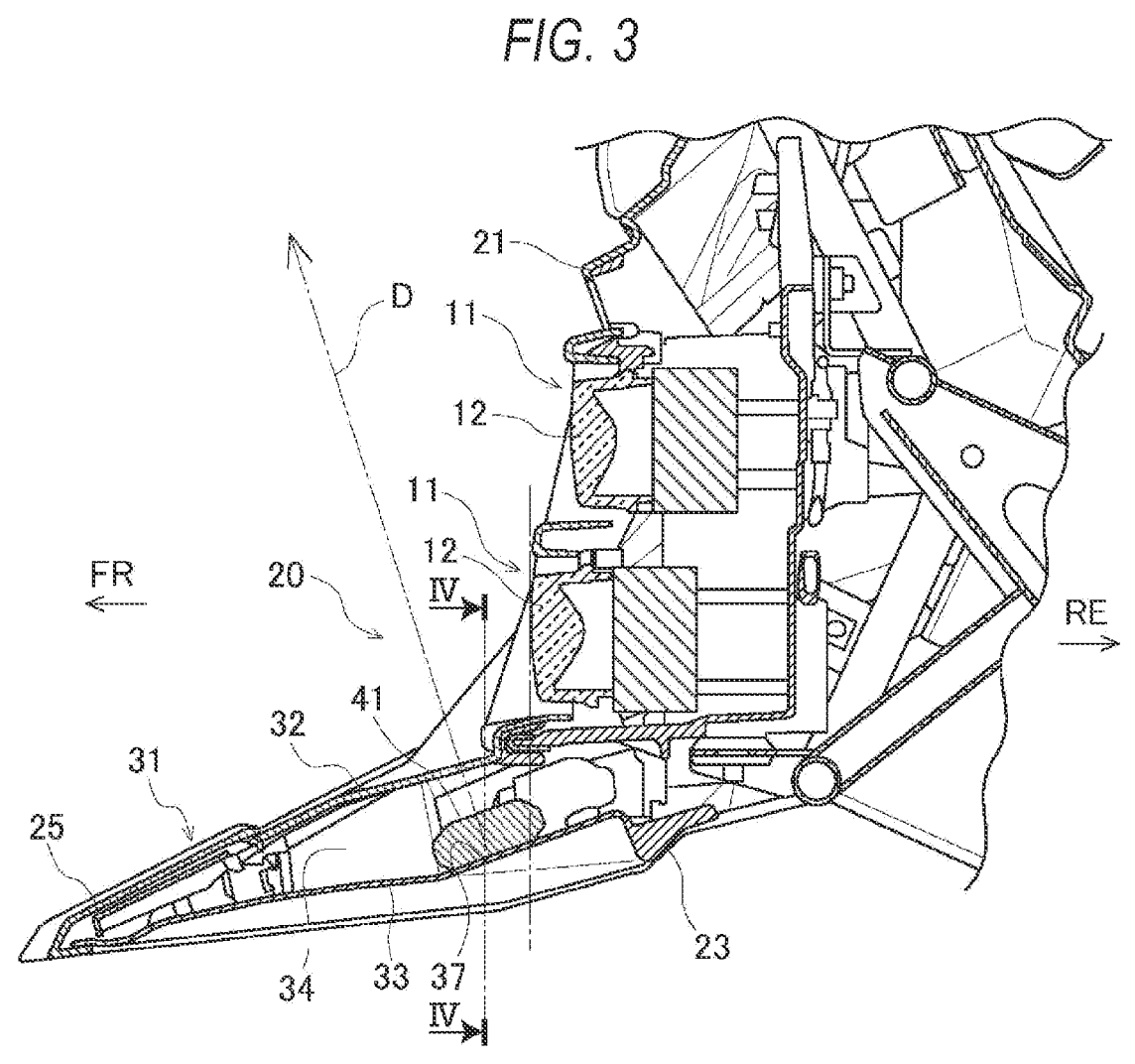

As shown in FIGS. 3 and 4, the protruding portion 31 of the front cover 20 secures a space for providing the communication device 41 below the headlamp unit 11. The protruding portion 31 is formed to be tapered forward and obliquely downward. An upper wall 32 of the protruding portion 31 is formed by the front center cover 21. The bottom wall 33 of the protruding portion 31 is formed by the front lower cover 23. Both side walls of the protruding portion 31 have a double structure. An inner side wall 34 of the protruding portion 31 is formed by the front center cover 21. An outer side wall 35 of the protruding portion 31 is formed by the front side cover 22.

The distal end cover 25 is attached to the protruding portion 31 in a state where the distal end cover 25 covers a boundary between the covers. The front center cover 21, the front lower cover 23, and the front side cover 22 are designed to have a sense of unity. A portion of the front lower cover 23 bulges upward to form a pedestal (a communication device support portion) 37 for the communication device 41. A support surface of the pedestal 37 is inclined obliquely downward toward the front. The communication device 41 is attached to the support surface of the pedestal 37 with a double-sided tape or the like. The communication device 41 is supported in an inclined state by the pedestal 37. A receiving direction D of the communication device 41 is directed forward and obliquely upward.

In this way, the pedestal 37 is provided on an inner side of the protruding portion 31 below the headlamp unit 11, to support the communication device 41. The appearance of the straddle-type vehicle 1 is improved by hiding the communication device 41 on a back side (a lower side) of the front center cover 21 in order not to affect the design of the front center cover 21. Since the communication device 41 is positioned below the headlamp unit 11, a communication cable 42 extending from the communication device 41 to a seat side can be shortened as compared with a case in which the communication device 41 is positioned above the headlamp unit 11. An additional component for attaching the communication device 41 is not necessary.

The communication device 41 is supported by the pedestal 37 in a state where a front end of the communication device 41 is located in front of a front end of the headlamp unit 11. That is, the communication device 41 is supported by the pedestal 37 in a state where a front end of the communication device 41 is located in front of a front end of the headlamp unit 11. That is, the communication device 41 is supported by the pedestal 37 in a state where a front end of the communication device 41 is located in front of a front surface of the lens 12. A metal component that does not allow radio waves to pass therethrough is used for the headlamp unit 11. A resin material that allows radio waves to pass therethrough is used for the front cover 20 such as the front center cover 21. Even in a case where the communication device 41 is supported below the metal component such as the headlamp unit 11, since a transmitting and receiving portion of the communication device 41 protrudes forward from the headlamp unit 11, the communication performance of the communication device 41 is sufficiently secured via the front center cover 21.

As described above, the pedestal 37 of the front lower cover 23 is inclined forward and obliquely downward. The communication device 41 is supported by the pedestal 37 in a state where the receiving direction D is directed forward and obliquely upward. Accordingly, radio waves from obliquely above are less likely to be blocked by the headlamp unit 11, and the reception sensitivity of radio waves by the communication device 41 is improved. In particular, in a case where the communication device 41 is an ETC in-vehicle antenna, it is possible to favorably receive radio waves from an ETC roadside antenna provided in an upper portion of an entrance and exit gate. At this time, the communication device 41 is accommodated below the headlamp unit 11 in a state where the receiving direction D is not blocked by the headlamp unit 11, and the appearance of the straddle-type vehicle 1 is improved.

The pedestal 37 of the front lower cover 23 is covered with the upper wall 32 (the front center cover 21) from above. The pedestal 37 of the front lower cover 23 is covered with the outer side wall 35 (the front side cover 22) and the inner side wall 34 (the front center cover 21) from the sides. Since a space between the covers of the protruding portion 31 is covered with the distal end cover 25 from the outside, dust and the like are prevented from entering the inside of the protruding portion 31 from the space between the covers. Accordingly, the communication device 41 on the pedestal 37 is less likely to be dusted with dust from above or from the sides, and the trouble of cleaning the communication device 41 is reduced.

As shown in FIG. 5, a pair of projections 24 at a distal end of the front lower cover 23 are inserted into a pair of slits at a distal end of the front center cover 21, and the front lower cover 23 is hooked to the front center cover 21. The front lower cover 23 is clipped to four front and rear portions of the pair of front side covers 22 by clips 45. In this way, the front lower cover 23 supporting the communication device 41 is detachably attached to the pair of front side covers 22. The communication device 41 is configured to be easily attached to and detached from the straddle-type vehicle 1 together with the front lower cover 23, and the maintainability of the communication device 41 is improved.

As described above, according to the support structure for the communication device 41 in the present embodiment, the communication device 41 is supported below the headlamp unit 11. Therefore, the communication device 41 is inconspicuous, and the appearance of the straddle-type vehicle 1 is improved. A space below the headlamp unit 11 is less likely to be affected by rain and wind, and the durability of the communication device 41 is improved.

In the present embodiment, the front cover of the straddle-type vehicle is formed with a beak-shaped protruding portion. Alternatively, the front cover may not be formed with a beak-shaped protruding portion. It is sufficient that the front cover is formed with a communication device support portion capable of supporting the communication device below the headlamp unit.

In the present embodiment, the communication device is accommodated inside the protruding portion of the front cover. Alternatively, the communication device may be exposed to the outside as long as the communication device is located below the headlamp unit.

In the present embodiment, the front lower cover is hooked to the front center cover, and the front lower cover is clipped to the front side cover. Alternatively, an attaching method for the front lower cover is not particularly limited. It is sufficient that the front lower cover is detachably attached to the front center cover or the front side cover.

In the present embodiment, the communication device support portion is formed by a pedestal bulging from the front lower cover. The shape of the communication device support portion is not particularly limited as long as the communication device support portion is configured to support the communication device in a state where the receiving direction of the communication device is not blocked by the headlamp unit.

The communication device according to the present embodiment is not limited to the ETC in-vehicle antenna, and may be any communication device configured to communicate with another communication device located above the straddle-type vehicle.

As described above, in a first aspect, a support structure for a communication device (41) mounted on a straddle-type vehicle (1) includes a headlamp unit (11) configured to illuminate front of the vehicle, and a communication device support portion (the pedestal 37) configured to support the communication device. The communication device support portion is located below the headlamp unit. According to this configuration, since the communication device is supported below the headlamp unit, the communication device is inconspicuous, and the appearance of the straddle-type vehicle is improved. A space below the headlamp unit is less likely to be affected by rain and wind, and the durability of the communication device is improved.

A second aspect is directed to the first aspect, in which the communication device support portion is configured to support the communication device in a state where a front end of the communication device is located in front of a front end of the headlamp unit.

According to this configuration, even in a case where the communication device is supported below the headlamp unit, the communication performance of the communication device is secured.

A third aspect is directed to the first aspect and the second aspect, in which the communication device support portion is configured to support the communication device in a state where a receiving direction (D) of the communication device is directed forward and obliquely upward. According to this configuration, radio waves from obliquely above are less likely to be blocked by the headlamp unit, and the reception sensitivity of radio waves by the communication device is improved.

A fourth aspect is directed to the third aspect, in which the communication device is accommodated below the headlamp unit in a state where the receiving direction of the communication device is not blocked by the headlamp unit. According to this configuration, the communication device is accommodated below the headlamp unit, and the appearance of the straddle-type vehicle is further improved.

A fifth aspect is directed to any one of the first aspect to the fourth aspect, in which a periphery of the headlamp unit is covered with a front cover (20), the front cover protrudes forward from below the headlamp unit, and an upper cover (the front center cover 21 and the front side cover 22) is provided in a protruding portion (31) of the front cover, the upper cover being configured to cover the communication device support portion from above. According to this configuration, the headlamp unit is protected from flying stones and the like by the protruding portion of the front cover, and a space for providing the communication device is secured by the protruding portion of the front cover. The communication device is covered with the upper cover of the front cover from above, and the communication device is less likely to be dusted with dust and the like from above.

A sixth aspect is directed to the fifth aspect, in which the communication device support portion is covered with the upper cover from a side. According to this configuration, the communication device is less likely to be dusted with dust and the like from a side.

A seventh aspect is directed to the fifth aspect or the sixth aspect, in which a lower cover (the front lower cover 23) is provided in the protruding portion of the front cover, the lower cover being configured to be attached to and to be detached from the upper cover, and the communication device support portion is provided in the lower cover. According to this configuration, the communication device is easily attached to and detached from the straddle-type vehicle together with the lower cover, and the maintainability of the communication device is improved.

Although the present embodiment has been described, as another embodiment, the above-described embodiment and modification may be combined entirely or partially.

The technique according to the present invention is not limited to the above embodiment, and may be variously changed, replaced, or modified without departing from the gist of the technical concept. Furthermore, as long as the technical concept can be achieved using other methods by the progress of the technique or other derivative techniques, the present invention may be implemented using the methods. Therefore, the claims cover all embodiments that may fall within the scope of the technical concept.

What is claimed is:

1. A support structure for a communication device mounted on a straddle-type vehicle, the support structure comprising:

a headlamp unit configured to illuminate in front of the vehicle; and a communication device support portion including a support surface configured to support the communication device from below, wherein the support surface of the communication device support portion is located below the headlamp unit, and the support surface of the communication device support portion is inclined obliquely downward toward the front such that the communication device is inclined obliquely downward toward a front of the vehicle, a periphery of the headlamp unit is covered with a front center cover, a front lower cover is provided below the front center cover, the front center cover and the front lower cover are at the foremost portion of the vehicle body, a portion of the front lower cover bulges upward to form the communication device support portion, wherein the communication device support portion is configured to support the communication device in a state where a front end of the communication device is located in front of a front end of the headlamp unit.

2. The support structure for a communication device according to claim 1, wherein the communication device support portion is configured to support the communication device in a state where a receiving direction of the communication device is directed forward and obliquely upward.

3. The support structure for a communication device according to claim 2, wherein the communication device is accommodated below the headlamp unit in a state where the receiving direction of the communication device is not blocked by the headlamp unit.

4. The support structure for a communication device according to claim 1, wherein the front center cover protrudes forward from below the headlamp unit to form a protruding portion, and the front center cover and the pair of front side covers are provided in the protruding portion, the upper cover being configured to cover the communication device support portion from above.

5. The support structure for a communication device according to claim 4, wherein the communication device support portion is covered with the front center cover and the pair of front side covers from a side.

6. The support structure for a communication device according to claim 5, wherein a front lower cover is provided in the protruding portion, the front lower cover being configured to be attached to and to be detached from the front center cover and the pair of front side covers.

7. The support structure for a communication device according to claim 1, wherein the communication device is configured to transmit and receive radio waves through an upper surface of the communication device, and a receiving direction or a transmission direction of the communication device is directed forward and obliquely upward.

8. The support structure for a communication device according to claim 1, wherein front portions of a pair of front side covers cover sides of the front center cover, the front center cover and the pair of front side covers protrude forward to form a protruding portion in a beak shape, an upper wall of the protruding portion is formed by the front center cover, and a bottom wall of the protruding portion is formed by the front lower cover, and both side walls of the protruding portion have a double structure, an inner side wall of the protruding portion is formed by the front center cover, and an outer side wall of the protruding portion is formed by the front side cover.

9. The support structure for a communication device according to claim 1, wherein front portions of a pair of front side covers cover sides of the front center cover, the front center cover and the pair of front side covers protrude forward to form a protruding portion in a beak shape, a distal end cover is attached to the protruding portion in a state where the distal end cover covers a boundary between the front center cover and the front side covers.

10. The support structure for a communication device according to claim 1, a pair of projections at a distal end of the front lower cover are inserted into a pair of slits at a distal end of the front center cover, and the front lower cover is hooked to the front center cover.

11. The support structure for a communication device according to claim 1, front portions of a pair of front side covers cover sides of the front center cover, and the front lower cover is clipped to four front and rear portions of the pair of front side covers by clips.

12. A support structure for a communication device mounted on a straddle-type vehicle, the support structure comprising:

a headlamp unit configured to illuminate in front of the vehicle; and a communication device support portion including a support surface configured to support the communication device from below, wherein the support surface of the communication device support portion is located below the headlamp unit, the support surface of the communication device support portion is inclined obliquely downward toward the front such that the communication device is inclined obliquely downward toward a front of the vehicle, a periphery of the headlamp unit is covered with a front cover, the front cover protrudes forward from below the headlamp unit, a front center cover and a pair of front side covers are provided in a protruding portion of the front cover, the front center cover and the pair of front side covers being configured to cover the communication device support portion from above, a front lower cover is provided in the protruding portion of the front cover, the front lower cover being configured to be attached to and to be detached from the front center cover and the pair of front side covers, the protruding portion of the front cover secures a space for providing the communication device below the headlamp unit, the communication device support portion is provided on an inner side of the protruding portion below the headlamp unit to support the communication device, the communication device is configured to transmit and receive radio waves through an upper surface of the communication device, the communication device support portion is configured to support the communication device in a state where a front end of the communication device is located in front of a front end of the headlamp unit, the communication device is supported by the communication device support portion in a state where a front end of the communication device is located in front of a front end of the headlamp unit, the communication device support portion is configured to support the communication device in a state where a receiving direction of the communication device is directed forward and obliquely upward, and the receiving direction of the communication device is directed to a space in front of a lens of the headlamp unit.

13. The support structure for a communication device according to claim 12, a bottom wall of the protruding portion is formed by the front lower cover, and the support surface of the communication device support portion is formed in a portion of the front lower cover.

14. The support structure for a communication device according to claim 12, wherein the communication device is accommodated below the headlamp unit in a state where the receiving direction of the communication device is not blocked by the headlamp unit.

15. The support structure for a communication device according to claim 12, wherein the communication device support portion is covered with the front center cover and the pair of front side covers from a side.

16. The support structure for a communication device according to claim 2, the front lower cover is provided below the front center cover, a portion of the front lower cover bulges upward to form the communication device support portion.

* * * * *